(12) United States Patent
Chung et al.

(10) Patent No.: US 7,965,921 B2
(45) Date of Patent: Jun. 21, 2011

(54) STORAGE MEDIUM INCLUDING TEXT-BASED CAPTION INFORMATION, REPRODUCING APPARATUS AND REPRODUCING METHOD THEREOF

(75) Inventors: Hyun-kwon Chung, Seoul (KR); Sung-wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1489 days.

(21) Appl. No.: 10/954,356

(22) Filed: Oct. 1, 2004

(65) Prior Publication Data
US 2005/0105890 A1 May 19, 2005

(30) Foreign Application Priority Data

Oct. 1, 2003 (KR) .................. 10-2003-0068336
Dec. 4, 2003 (KR) .................. 10-2003-0087554

(51) Int. Cl.
*H04N 9/80* (2006.01)
(52) U.S. Cl. ......... 386/240; 386/241; 386/326; 386/327
(58) Field of Classification Search .............. 386/95–96, 386/125–126
See application file for complete search history.

(56) References Cited

U.S. PATENT DOCUMENTS

| | | | | |
|---|---|---|---|---|
| 6,046,778 A | * | 4/2000 | Nonomura et al. | 348/565 |
| 6,661,467 B1 | * | 12/2003 | Van Der Meer et al. | 348/564 |
| 2001/0030710 A1 | | 10/2001 | Werner | |
| 2002/0006271 A1 | | 1/2002 | Winter et al. | |
| 2003/0161615 A1 | * | 8/2003 | Tsumagari et al. | 386/95 |

FOREIGN PATENT DOCUMENTS

| | | |
|---|---|---|
| CN | 1145152 | 3/1997 |
| EP | 1 235 437 | 8/2002 |
| JP | 10-271439 | 10/1998 |
| JP | 11-168702 | 6/1999 |
| JP | 2002-101389 | 4/2002 |
| JP | 2003-143526 | 5/2003 |
| KR | 2003-44561 | 6/2003 |
| KR | 2003-80005 | 10/2003 |
| WO | WO 96/19077 | 6/1996 |
| WO | WO 02/069646 | 9/2002 |
| WO | WO 2004/036574 | 4/2004 |
| WO | WO 2004/090885 | 10/2004 |
| WO | WO 2005/031739 A1 | 4/2005 |

OTHER PUBLICATIONS

Office Action issued in Korean Patent Application No. 2003-87554 on May 17, 2006.
Search Report issued in corresponding European Patent Application No. 04793422.9 dated Sep. 27, 2007.
Microsoft Corporation, "Understanding SAMI 1.0", Internet Citation, Oct. 2001, XP007902747, pp. 1-11.

(Continued)

*Primary Examiner* — Jamie Atala
(74) *Attorney, Agent, or Firm* — NSIP Law

(57) ABSTRACT

A storage medium including moving picture data and subtitle data to be output as a graphic overlapping an image based on the moving picture data, wherein the subtitle data includes text data to generate pixel data converted into a bitmap image, and control information to control the pixel data to be output in real time, and a reproducing apparatus and reproducing method using the storage medium.

18 Claims, 13 Drawing Sheets

OTHER PUBLICATIONS

Blu-ray Disc Founders, "White paper Blu-ray Disc Format: 2.B Audio Visual Application Format Specifications for BD-ROM", Internet citation, Aug. 2004, pp. 1-35.
ETSI Standards, "Digital Video Broadcasting (DVB) Subtitling Systems", vol. BC, No. V121, Jun. 2002, pp. 1-48.
NCAM Rich Media Accessibility, "Adding a Caption Track in Quick Time," online document, cached on Aug. 24, 2003, retrieved on Apr. 30, 2009, Carl and Ruth Shapiro Family National Center for Accessible Media at WGBH (NCAM), Boston, MA (6 pages).
European Search Report issued on Nov. 26, 2009, in counterpart European Application No. 09172654.7 (4 pages).
Japanese Office Action issued on Jul. 20, 2010, in corresponding Japanese Application No. 2006-532085 (2 pages).
European Search Report issued on Nov. 4, 2010, in corresponding European Patent Application No. 10167244.2 (10 pages).
Chinese Office Action issued on Mar. 29, 2010, in corresponding Chinese Application No. 200910140976.8 (9 pages).

* cited by examiner

EXAMPLE OF TEXT CAPTION DATA TO GENERATE PIXEL DATA

EXAMPLE OF GRAPHIC CONTROL INFORMATION
TO CONTROL REAL TIME DISPLAY OF CAPTION

FIG. 14

SUBTITLE DATA FOR DVD

| | | |
|---|---|---|
| CAPTION #1 | | |
| CAPTION #2 | <text> | pxd=" ₩o2000 ₩₩b0 ₩₩c1 ₩₩f0 ₩₩s20 ₩₩l20 ₩Hello, ₩b1 ₩Subtitle ₩b0 ₩₩i1 ₩₩n ₩₩World"<br>pxd_w = "width"<br>pxd_h = "height" |
| CAPTION #3 | | |
| CAPTION #4 | <control> | display_time_start="hh:mm:ss:ff"<br>display_time_end="hh:mm:ss:ff"<br>display_area="Xs,Ys,Xe,Ye"<br>display_position="address" |
| ... | | |
| CAPTION #n | | |

STORAGE MEDIUM INCLUDING TEXT-BASED CAPTION INFORMATION, REPRODUCING APPARATUS AND REPRODUCING METHOD THEREOF

CROSS-REFERENCE TO RELATED APPLICATIONS

This application claims the benefit of Korean Patent Application Nos. 2003-68336 filed on Oct. 1, 2003, and 2003-87554 filed on Dec. 4, 2003, in the Korean Intellectual Property Office, the disclosures of which are incorporated herein by reference in their entireties.

BACKGROUND OF THE INVENTION

1. Field of the Invention

The present invention relates to reproduction of data on a storage medium, and, more particularly, to a storage medium containing text-based caption information compatible with the subpicture method of a digital versatile disc (DVD) and the presentation method of a Blu-ray disc, and a reproducing apparatus and reproducing method thereof.

2. Description of the Related Art

Among conventional caption technologies, there exists text-based caption technologies, which are mainly used in a personal computer (PC), and a subpicture-graphic-based caption technology, which is used in a DVD.

First, as examples of the conventional text-based caption technologies mainly used in a PC, there are Synchronized Accessible Media Interchange (SAMI) of Microsoft, and Real-text technology of RealNetworks. The conventional text-based caption technologies have a structure in which a caption is output on the basis of synchronization information in relation to a file in which video stream data is recorded, or video stream data provided on a network.

FIG. 1 is a diagram illustrating the structure of a caption file used in a text-based caption technology mainly used in the conventional PC.

Referring to FIG. 1, there is a text-based caption file for video stream data, and a caption for video stream data is output on the basis of synchronization time information, for example, <sync time 00:00>, contained in the caption file. An example of a caption file constructed assuming continuous reproduction of the video stream data is shown.

FIG. 2 is a diagram illustrating the structure of an apparatus reproducing the conventional text-based captions.

Referring to FIG. 2, a text caption file is read from a storage medium 200, stored in a text caption data and font data buffer 220, and then converted into bitmap image graphic data by a text caption decoder 222. By control of a graphic controller/graphic data buffer 224, the converted graphic data is output on the screen 232 via a blender 226 overlapping video frame data from a video frame buffer 214 that has been decoded in a video decoder 212 after being separated by a demultiplexer 211 from audio/video (AV) data read out from an AV data buffer 210. A speaker 230 reproduces audio data that has been decoded by an audio decoder 213 after being separated by the demultiplexer 211 from the AV data read out from the AV data buffer 210

However, as shown in FIG. 2, the conventional text-based caption file structure considers only synchronization time (<sync time=00:00>) by which a caption is displayed on the screen, and the type, size, and color of font when a caption is output on the screen, but does not consider how long a bitmap image is kept in a buffer after the bitmap is generated by decoding text caption data. Accordingly, there is a problem such that in a reproducing apparatus using a low speed processor, a caption cannot be output on the screen in real time as the conventional DVD reproducing apparatus reproduces data.

Meanwhile, the subpicture-graphic-based caption technology used in the conventional DVD will now be explained.

A DVD uses a bitmap image for a subtitle. Subtitle data of a bitmap image is losslessly encoded and recorded on a DVD. A maximum of 32 losslessly encoded bitmap images are recorded on a DVD.

FIG. 3 is a diagram illustrating the data structure of the conventional DVD explaining the structure of a caption file used in a subpicture-graphic-based caption technology used in the conventional DVD.

Referring to FIG. 3, in a DVD, the disc area is divided into a video manager (VMG) area and a plurality of video title set (VTS) areas. Title information and information on title menus is stored in the VMG area, and information on the title is stored in the plurality of VTS areas. The VMG area is formed with 2~3 files, and each of the VTS areas is formed with 3~12 files. The VMG area includes a VMGI area storing additional information on the VMG, a video object set (VOBS) area storing moving information (video objects) on a menu, and a backup area (BUP) of the VMGI. These areas are stored as one file and among them the presence of the VOBS area is optional.

In a VTS area, information on a title that is a reproduction unit, and a VOBS having moving picture data is stored. In one VTS, at least one title is recorded. The VTS area includes video title set information (VTSI), a VOBS having moving picture data for a menu screen, a VOBS having moving picture data of a video title set, and backup data of the VTSI. The presence of the VOBS to display the menu screen is optional. Each VOBS is again divided into recording units of a VOB and Cells that are recording units. One VOB is formed with a plurality of Cells. The smallest recording unit mentioned in the present invention is the Cell.

FIG. 4 is a diagram illustrating a detailed structure of the VOBS having moving picture data in the data structure of the conventional DVD shown in FIG. 3.

Referring to FIG. 4, one VOBS is formed with a plurality of VOBs, and one VOB is formed with a plurality of Cells. A Cell is again formed with a plurality of video object units (VOBUs). A VOBU is data encoded by a moving picture experts group (MPEG) method that is a moving picture coding method used in a DVD. According to the MPEG, since images are coded through spatiotemporal compression, a previous or succeeding image is required to decode a predetermined image. Accordingly, in order to support a random access function by which reproduction starts from an arbitrary position, intra coding that does not require a previous or succeeding image is performed in each predetermined interval. In the MPEG, this is referred to as an intra picture or I picture, and pictures between this I picture and the next I picture are referred to as a group of pictures (GOP). Usually, a GOP is formed with 12~15 images.

Meanwhile, the MPEG defines system coding (ISO/IEC13818-1) to combine video data and audio data into one bitstream. The system coding defines two multiplexing methods: a program stream (PS) multiplexing method for optimization to generate one program and store in an information storage medium, and a transport stream (TS) multiplexing method appropriate to generate a plurality of programs for transmission. The conventional DVD employs the PS coding method.

According to the PS coding method, video data or audio data is divided into units referred to as a pack (PCK) and multiplexed through a time division method. Data other than video data and audio data defined by the MPEG is named as a private stream and also is contained in the PCKs such that the private stream can be multiplexed together with the video data and audio data.

A VOBU is formed with a plurality of packs (PCK). The first pack (PCK) among the plurality of packs (PCK) is a navigation pack (NV_PCK), and the remaining packs include video packs (V_PCKs), audio packs (A_PCKs), and subpicture packs (SP_PCKs). Video data contained in a video pack is formed with a plurality of GOPs.

The subpicture pack (SP_PCK) is used for 2-dimensional graphic data and caption data. That is, in a DVD, caption data displayed overlapping a video image is encoded by the same method as for 2-dimensional graphic data. In the case of DVD, a separate encoding method to support multiple languages is not employed and each caption data is converted into graphic data and then processed and recorded by one encoding method. The graphic data for a caption is referred to as a subpicture. The subpicture is formed with subpicture units (SPUs). A subpicture unit corresponds to one sheet of graphic data.

FIG. 5 is a diagram illustrating the correlation of a subpicture pack (SP_PCK) and a subpicture unit (SPU) in the structure of the VOBS having moving picture data shown in FIG. 4.

Referring to FIG. 5, one subpicture unit (SPU) includes a subpicture unit header (SPUH), pixel data (PXD), and a subpicture display control sequence table (SP_DCSQT). These are sequentially divided and recorded in subpicture packs (SP_PCK) each with a size of 2048 bytes. At this time, if the last data of the subpicture unit (SPU) cannot fill one subpicture pack (SP_PCK) fully, the remainder of the last subpicture pack (SP_PCK) is filled with padding data. As a result, one subpicture unit (SPU) is formed with a plurality of subpicture packs (SP_PCKS).

Recorded in the subpicture unit header (SPUH) are the size of the entire subpicture unit (SPU) and the location from which the subpicture display control sequence table (SP_DCSQT) having display control information in the subpicture unit (SPU) starts. The pixel data (PXD) is coded data obtained by compression coding a subpicture. The pixel data (PXD) forming a subpicture can have four types of values, including background, pattern pixel, emphasis pixel-1, and emphasis pixel-2. The values can be expressed by two bits, and have binary values, 00, 01, 10, and 11, respectively. Accordingly, the subpicture can be regarded as a set of data formed with a plurality of lines and having four types of pixel values. Encoding is performed for each line.

FIG. 6 is a diagram illustrating a run-length coding method among methods of encoding the subpicture unit shown in FIG. 5.

Referring to FIG. 6, in the run-length coding method, when one to three instances of an identical pixel data value continue, the number of the continued pixel (No_P) is expressed by 2 bits and after that, a 2-bit pixel data value (PD) is recorded. When 4 to 15 instances of an identical pixel data value continue, the first 2 bits are recorded as 0s, 4 bits are used to record the No_P, and 2 bits are used to record the PD. When 16 to 63 instances of an identical pixel data value continue, the first 4 bits are recorded as 0s, 6 bits are used to record the No_P, and 2 bits are used to record the PD. When 64 to 255 instances of an identical pixel data value continue, the first 6 bits are recorded as 0s, 8 bits are used to record the No_P, and 2 bits are used to record the PD. When a run of identical pixel data values continues to the end of a line, the first 14 bits are recorded as 0s, and 2 bits are used to record PD. When encoding of one line is thus finished, if byte-unit alignment is not achieved, 4 bits of 0s are recorded. The number of encoded data bits in one line cannot exceed 1440 bits.

FIG. 7 is a diagram illustrating the data structure of the SP_DCSQT having output control information of pixel data (PXD) shown in FIG. 5.

Referring to FIG. 7, the SP_DCSQT contains output control information for outputting the pixel data (PXD) described above. The SP_DCSQT is formed with a plurality of subpicture display control sequences (SP_DCSQ). One SP_DCSQ is a set of output control commands (SP_DCCMDs) performed at one time, and is formed with an SP_DCSQ_STM indicating a starting time, an SP_NXT_DCSQ_SA containing position information of the next SP_DCSQ, and a plurality of SP_DCCMDs.

The SP_DCCMD includes control information on how the pixel data (PXD) described above is combined with a video image and output, and includes color information of the pixel data, transparency information (or contrast information) of the video data, information on an output starting time, and an output finishing time.

FIG. 8 is a diagram illustrating the output result of a subpicture together with moving picture data according to the data structure described above.

Referring to FIG. 8, the pixel data itself is losslessly encoded, and information on a subpicture display area having an area where a subpicture is output in a video display area having a video image area, and information on an output starting time and finishing time are contained in the SP_DCSQT as output control information.

In a DVD, subpicture data for caption data of a maximum of 32 different languages can be multiplexed together with moving picture data and recorded. These languages are distinguished by a stream id provided by the MPEG system coding method, and a sub stream id defined by the DVD. Accordingly, if a user selects one language, the subpicture unit (SPU) is extracted by taking only subpicture packs (SP_PCK) having the stream id and sub stream id corresponding to the language, and then, by decoding the subpicture unit (SPU), caption data is extracted and, according to output control information, the output is controlled.

This caption technology based on the subpicture graphic formed with bitmap images used in the conventional DVD has the following problems.

First, if bitmap based caption data is multiplexed with moving picture data and recorded, when the moving picture data is encoded, the bit generation amount occupied by subpicture data should be considered in advance. That is, by converting the caption data into graphic data, the amount of data generated in each language is different and the entire amount is huge. Usually, encoding moving picture data is performed only once and, by addition to the output, subpicture data for each language is again multiplexed and a DVD appropriate to each region is manufactured. However, depending on the language, there occurs a case in which the amount of subpicture data is huge, and when the subpicture data is multiplexed with the moving picture data, the total generated bit amount exceeds the maximum limit. Also, since the subpicture data is multiplexed between each moving picture data unit, the starting position of each VOBU becomes different in each region. In a DVD, since the starting position of a VOBU is separately managed, whenever a multiplexing process begins, this information should also be updated.

Secondly, since the contents of each subpicture cannot be known, it cannot be used for a separate purpose such as outputting two languages at the same time, or outputting only caption data without moving picture data to use for language learning.

As described above, since the text-based caption technology used in a PC and the caption technology using subpicture graphics as in a DVD are designed differently, if text-based caption data information is applied to the DVD reproducing apparatus without change, such problems as difficulties in guaranteeing real time reproduction or managing a subpicture data buffer occur.

SUMMARY OF THE INVENTION

The present invention provides an information storage medium including text-based caption information to solve these and/or other problems of the text-based caption technology and the subpicture-graphic-based caption technology used in a DVD, and a reproducing apparatus and a reproducing method thereof.

Additional aspects and/or advantages of the invention will be set forth in part in the description which follows and, in part, will be obvious from the description, or may be learned by practice of the invention.

According to an aspect of the present invention, there is provided a storage medium including: moving picture data; and subtitle data to be output as a graphic overlapping an image based on the moving picture data, wherein the subtitle data includes: text data to generate pixel data converted into a bitmap image; and control information to control the pixel data to be output in real time.

The text data may generate the pixel data to be converted into the bitmap image such that caption contents are output as the graphic overlapping the image.

The text data may further include style information to specify the style of the caption output as the graphic overlapping the image, wherein the style information may include at least one of a pixel data area, a background color, a starting point at which a first letter of text begins, line spacing information, an output direction, a type of a font, font color, and a character code.

The control information may include time information indicating a time at which the pixel data is generated in a buffer memory and a time at which the pixel data is deleted in the buffer memory, and position information recording a position at which the pixel data is output.

The subtitle data may include the text data corresponding to pixel data (PXD) contained in subpicture information and the control information corresponding to display control information (SP_DCSQT). The subtitle data may be in a text format or a packet format.

The subtitle data may include the text data corresponding to a presentation composition segment (PCS) contained in presentation data, and the control information corresponding to an object definition segment (ODS). The subtitle data may be in a text format or in a packet format.

According to another aspect of the present invention, there is provided an apparatus to reproduce information from a storage medium including moving picture data and subtitle data to be output as a graphic overlapping on an image based on the moving picture data, the apparatus including: a text caption decoder to decode text data contained in the subtitle data and generate pixel data converted into a bitmap image, and decode and parse control information contained in the subtitle data to control a caption to be output in real time; and a graphic controller to control the pixel data to be output in real time using the control information.

The text caption decoder may include: a text caption parser to decode and parse the text data and the control information; and a font renderer to convert the parsed text data into a bitmap image so that the parsed text is output as the graphic overlapping the image.

The text caption parser may decode and parse style information from the text data and specify an output style of the caption, and the font renderer may convert the text data into the bitmap image reflecting the parsed style information.

The text caption parser may parse the text data and transfer the parsed text data to the font renderer. The text caption parser may parse time information indicating a time at which the pixel data is generated in a buffer memory and a time at which the pixel data is deleted in the buffer memory, and position information recording a position at which the pixel data is output, from the control information, and transfer the parsed information to the graphic controller, and the graphic controller may control the pixel data to be output in real time by using the parsed time information and position information.

The subtitle data may include the text data corresponding to pixel data contained in subpicture information of a DVD formed by a bitmap image reproducing method, and the control information corresponding to display control information (SP_DCSQT). The text caption parser may transfer the text data to the font renderer, and the control information to the graphic controller, and the graphic controller may control the pixel data (PXD) to be output in real time by using the transferred control information.

The subtitle data may include the text data corresponding to a PCS contained in presentation data of a Blu-ray disc formed by a bitmap image reproducing method, and the control information corresponding to an ODS. The text caption parser may transfer the text data to the font renderer, and the control information to the graphic controller, and the graphic controller may control the pixel data to be output in real time by using the transferred control information.

According to still another aspect of the present invention, there is provided a method of reproducing information from a storage medium including moving picture data and subtitle data to be output as a graphic overlapping on an image based on the moving picture data, the method including: reading the subtitle data including text data and control information from the storage medium; decoding the text data, parsing caption contents and output style information, and converting the caption contents into pixel data formed as a bitmap image based on the parsed style information; decoding the control information, parsing time information to control the pixel data to be output in real time, and parsing position information to control a position at which a caption is output; and outputting the converted pixel data in real time according to the parsed time information and position information.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 14 is a diagram of an embodiment of subtitle data in a text format that can be applied to a DVD;

DETAILED DESCRIPTION OF THE PREFERRED EMBODIMENTS

Figure 1:
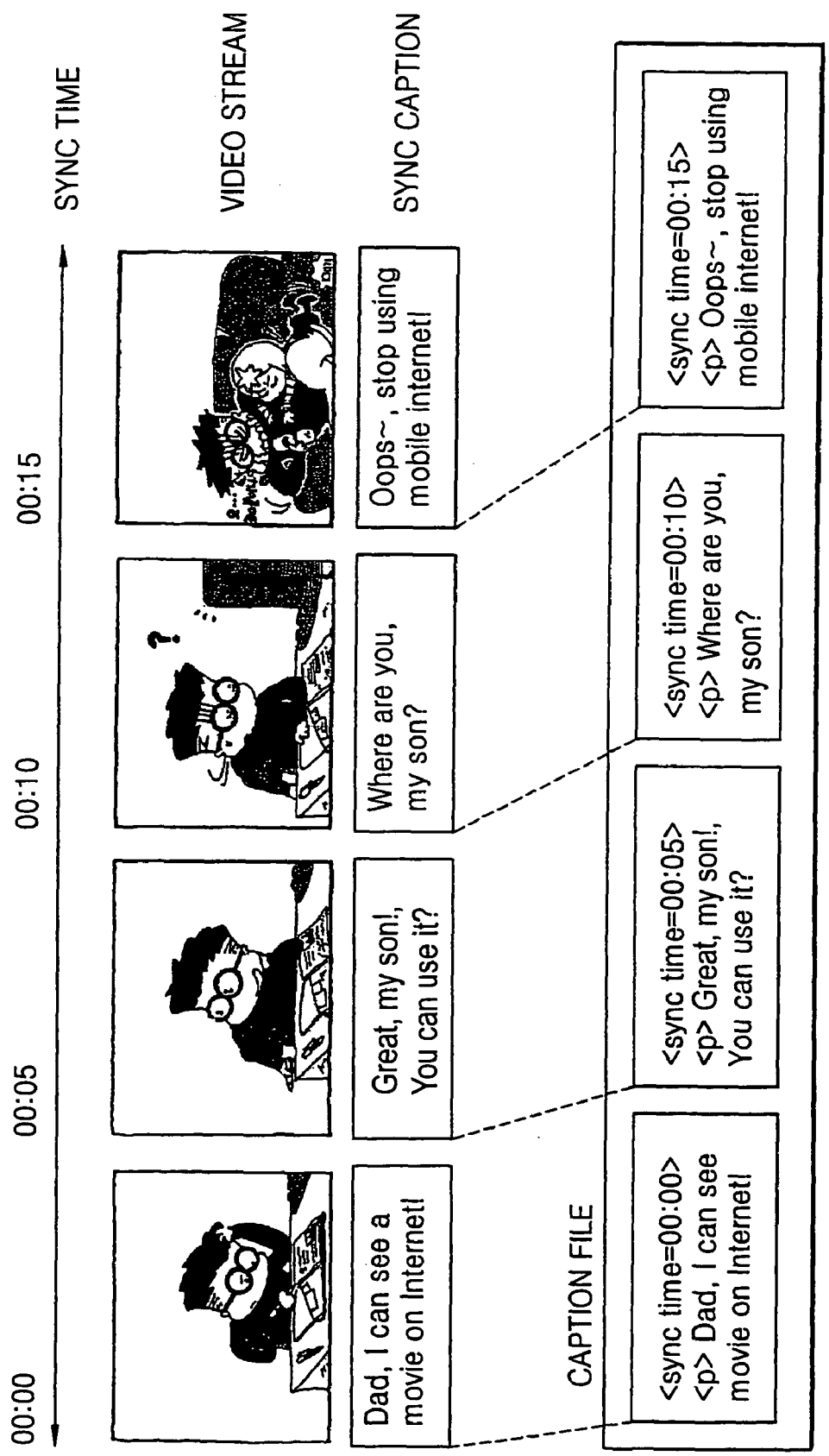
FIG. 1 is a diagram illustrating the structure of a caption file used in a text-based caption technology used in the conventional personal computer (PC)
Figure 2:
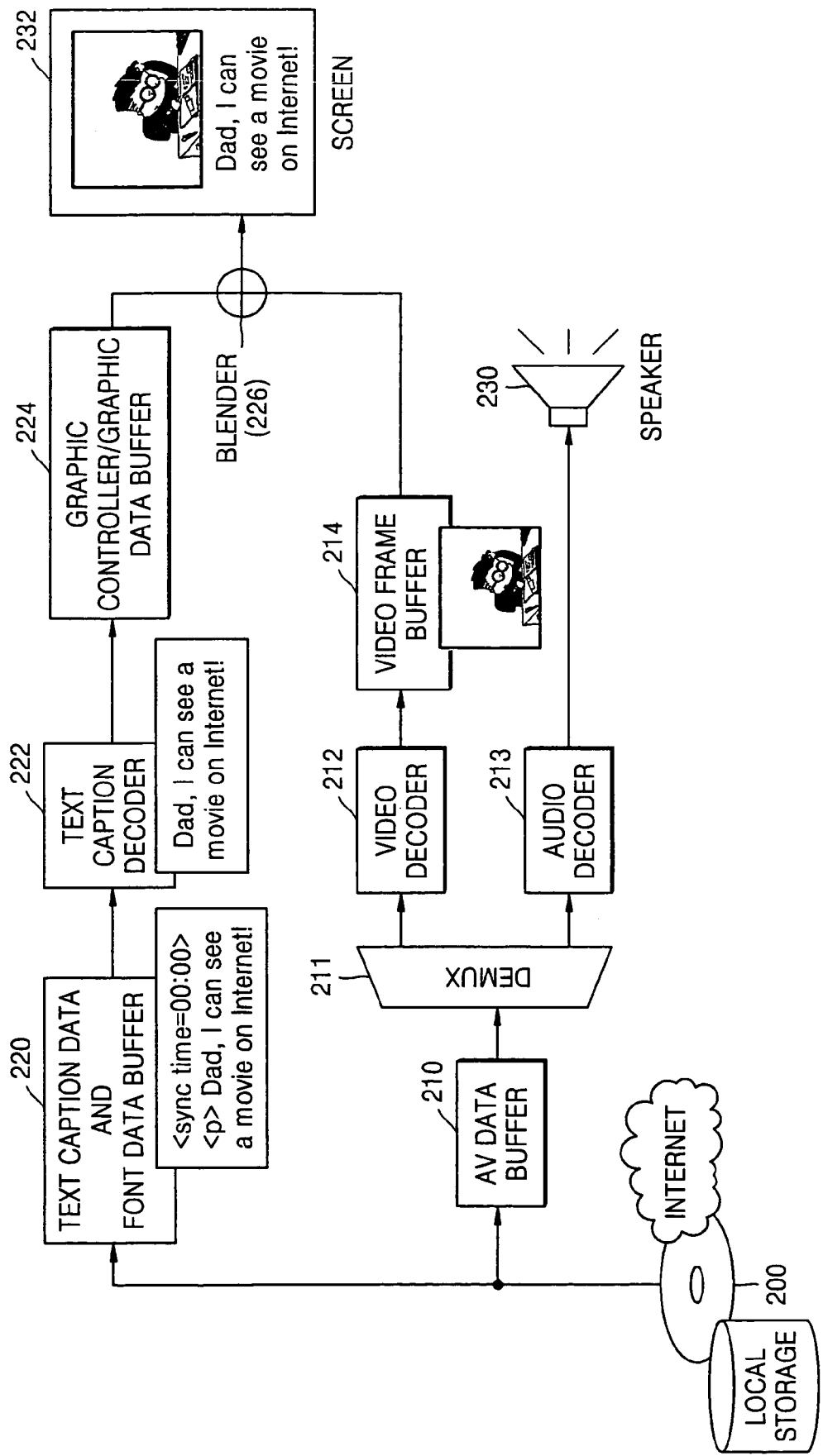
FIG. 2 is a diagram illustrating the structure of a reproducing apparatus reproducing the conventional text-based captions.
Figure 3:
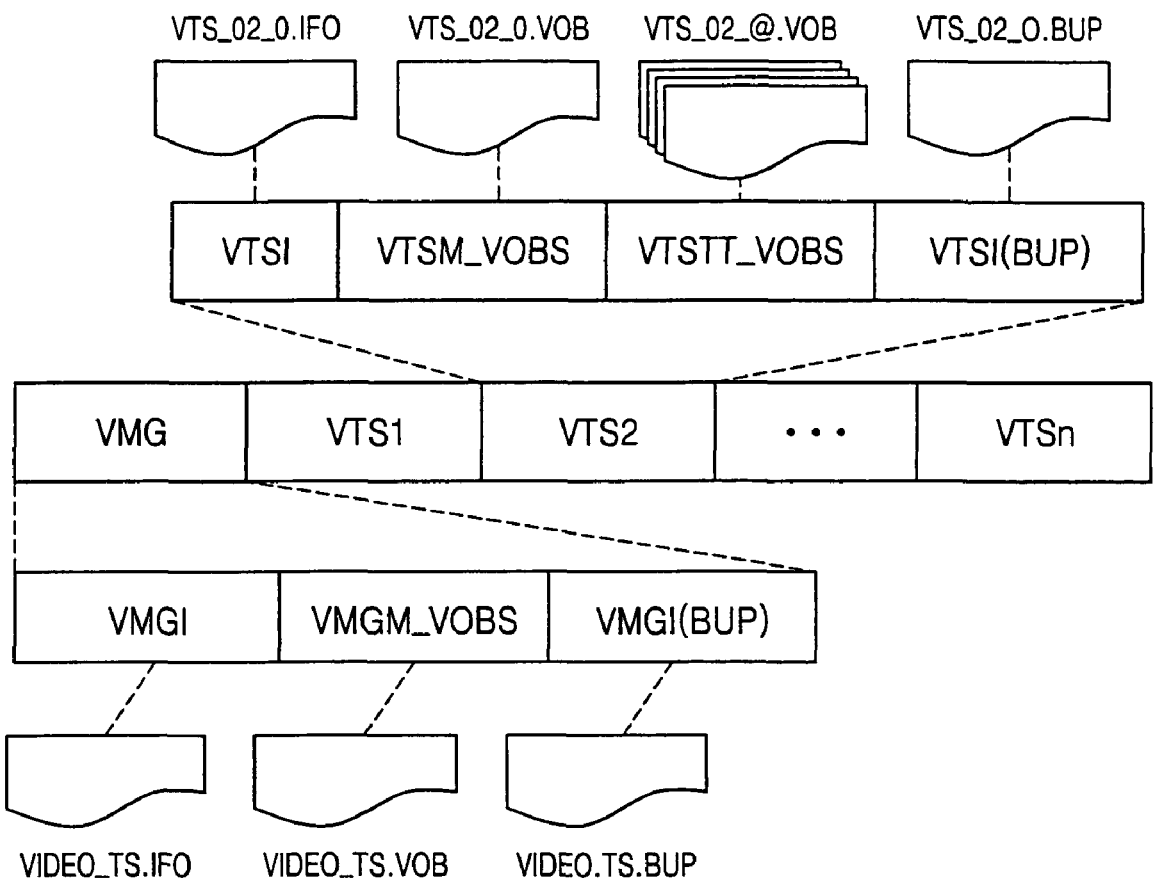
FIG. 3 is a diagram illustrating the data structure of the conventional DVD explaining the structure of a caption file used in a subpicture-graphic-based caption technology used in the conventional DVD.
Figure 4:
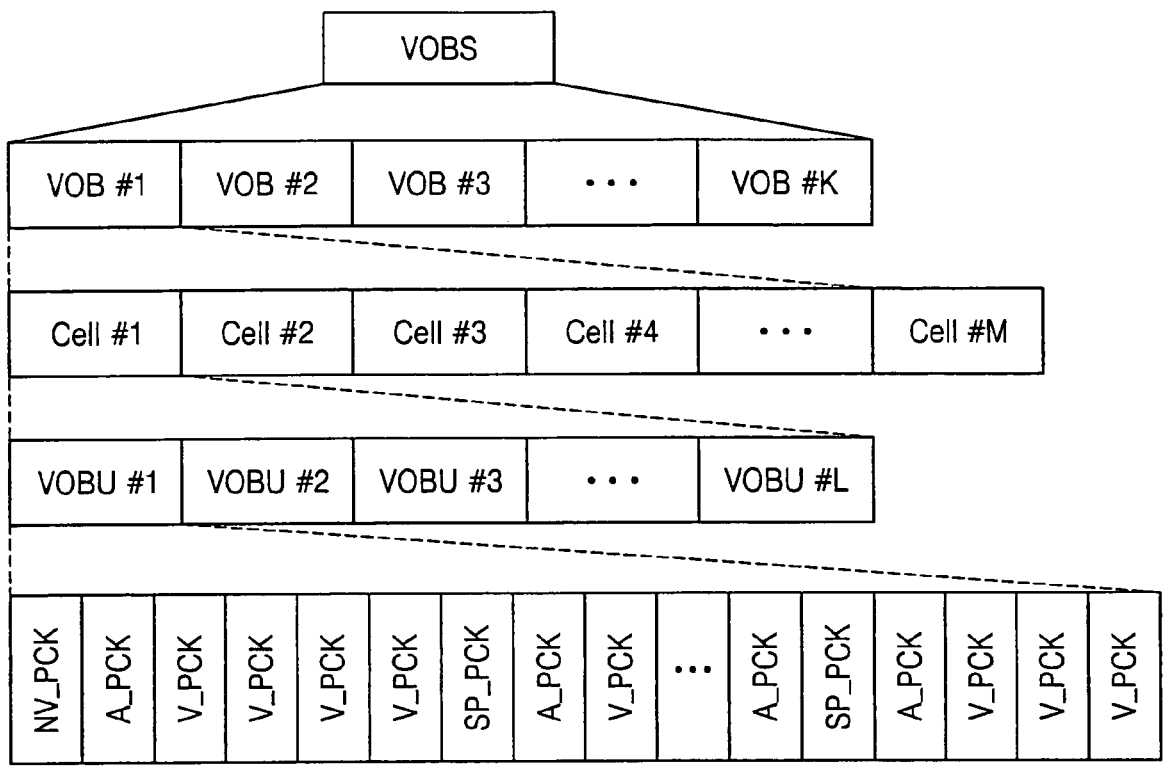
FIG. 4 is a diagram illustrating a detailed structure of video object set (VOBS) having moving picture data in the data structure of the conventional DVD shown in FIG. 3.
Figure 5:
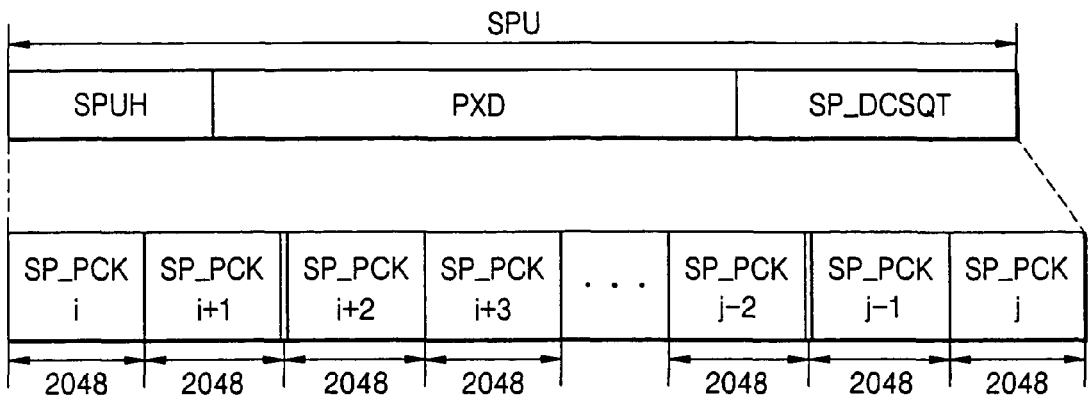
FIG. 5 is a diagram illustrating the correlation of a subpicture pack (SP_PCK) and a subpicture unit (SPU) in the structure of the VOBS having moving picture data shown in FIG. 4.
Figure 6:
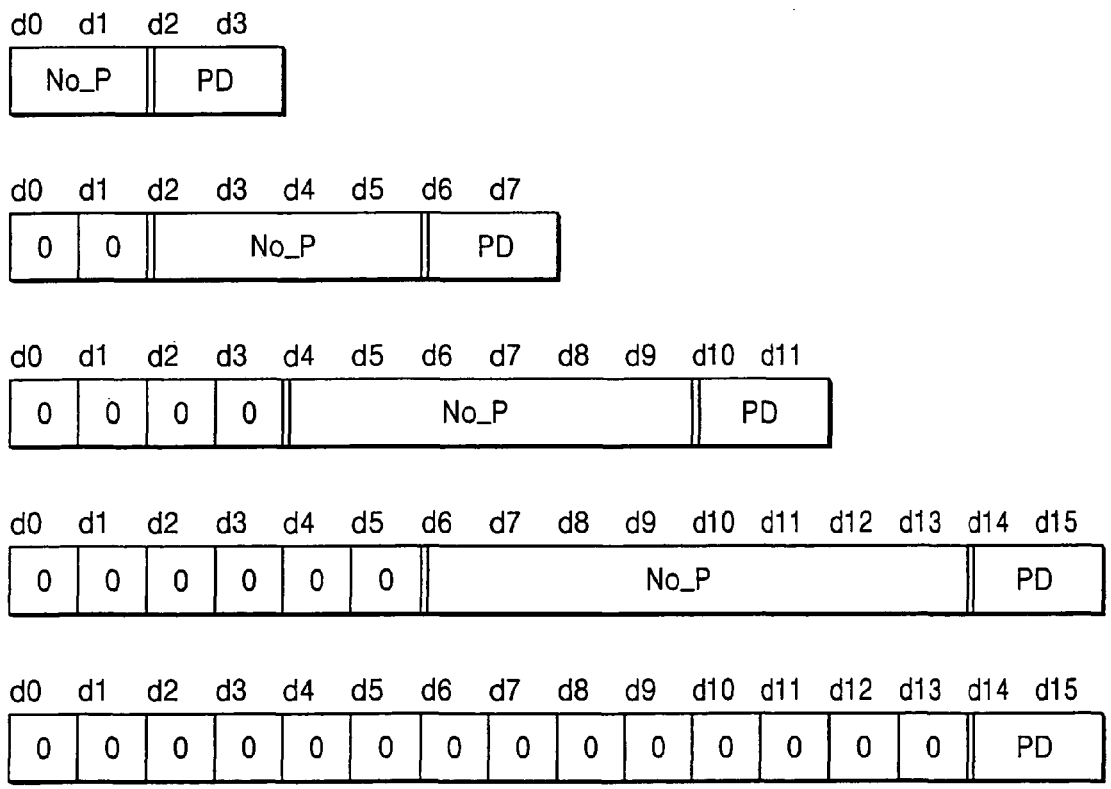
FIG. 6 is a diagram illustrating a run-length coding method among methods of encoding the subpicture unit shown in FIG. 5.
Figure 7:
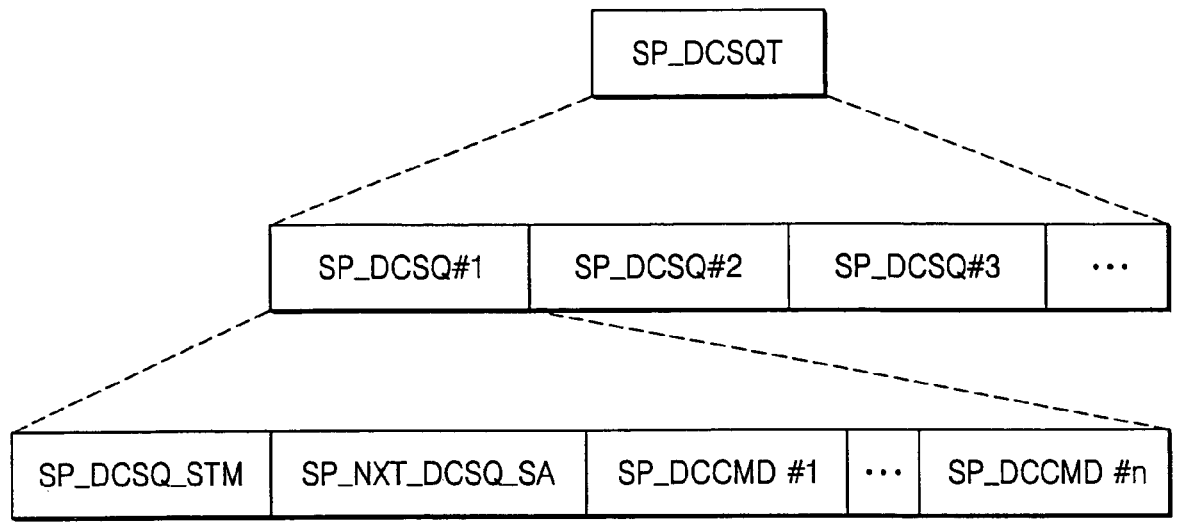
FIG. 7 is a diagram illustrating the data structure of the SP_DCSQT having output control information of pixel data (PXD) shown in FIG. 5.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 9:
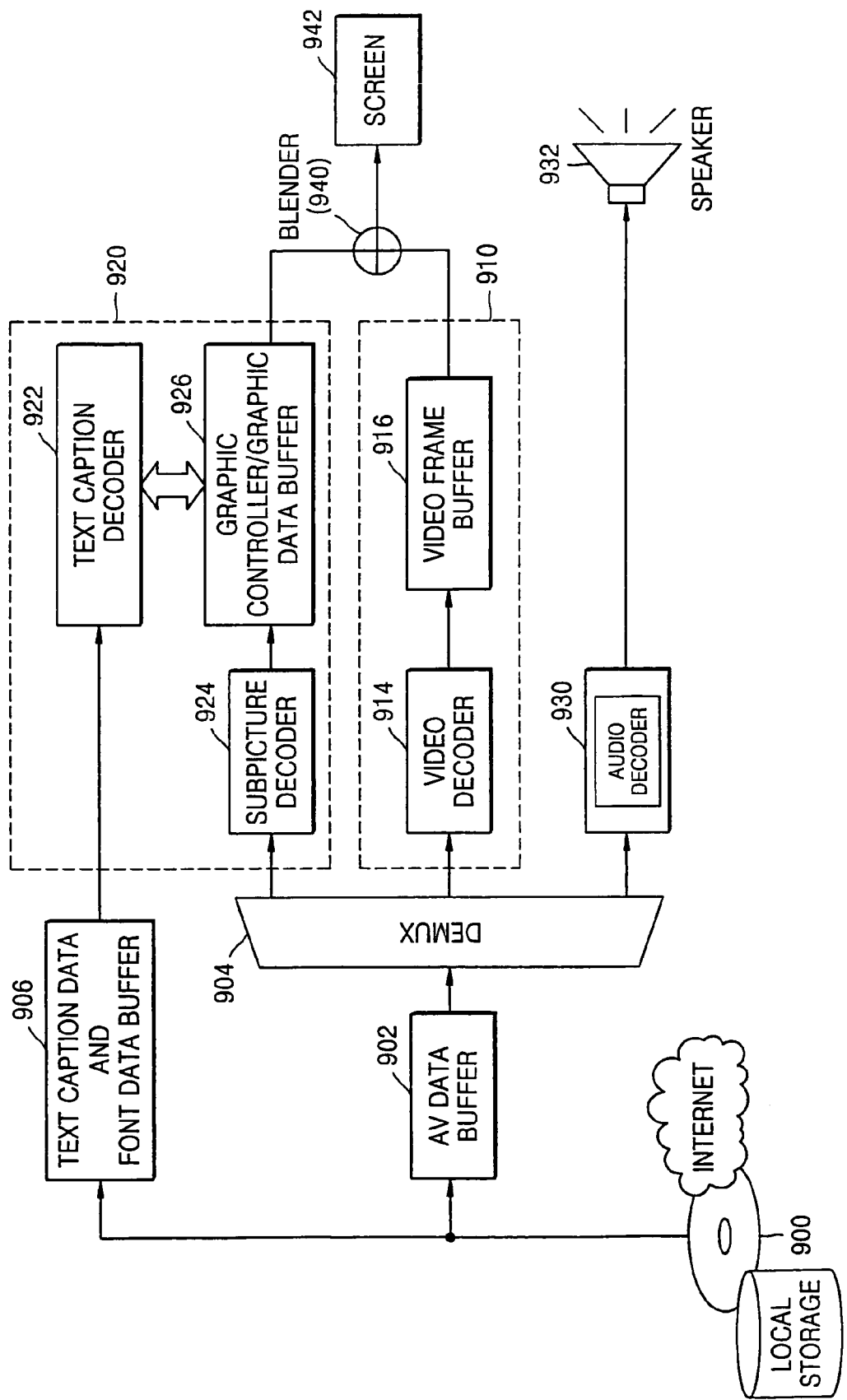
FIG. 9 is a block diagram of a reproducing apparatus processing a text caption according to an embodiment of the present invention.

Referring to FIG. 9, the reproducing apparatus processing a text-based caption according to an embodiment of the present invention includes buffer units 902 and 906, a demultiplexer 904, a video data processing unit 910, a text caption data processing unit 920, an audio data processing unit 930, and a blender 940.

According to the types of data to be stored, the buffer units 902 and 906 include an AV data buffer 902 storing moving picture data, and a text caption data and font data buffer 906 storing text-based caption data. Data read from a variety of storage media 900, including a removable storage medium such as an optical disc, a local storage, and storages on the Internet, is temporarily stored in each buffer according to the type of the data.

The video data processing unit 910 includes a video decoder 914 and a video frame buffer 916. The video decoder 914 receives compression coded moving picture data from the AV data buffer 902 separated by the demultiplexer 904 and decodes the data. The decoded video data is output to the a screen 942 through the video frame buffer 916 and the blender 940.

The text caption data processing unit 920 includes a text caption decoder 922, a subpicture decoder 924, and a graphic controller/graphic data buffer 926. The reproducing apparatus according to the present invention has the subpicture decoder 924 to process a subtitle of the conventional multiplexed subpicture type based on subtitle data from the AV data buffer 902 separated by the demultiplexer 904, and, in addition, has the text caption decoder 922 so that text-based caption data according to an embodiment of the present invention can be processed. The text caption decoder 922 decodes text data to generate a bitmap image for a caption and control information to control real time reproduction of a caption among subtitle data, and generates pixel data converted into a bitmap image. The control information among the decoded data is transferred to the graphic controller/graphic data buffer 926 such that the generated pixel data is controlled to be output in real time.

The audio data processing unit 930 has an audio decoder to decode audio data from the AV data buffer 902 separated by the multiplexer 904 so that the audio data is decoded and output through a speaker 932.

The blender 940 superimposes a bitmap image obtained by rendering caption data on video data obtained by decoding moving picture data, and outputs the data to the screen 942.

Figure 10:
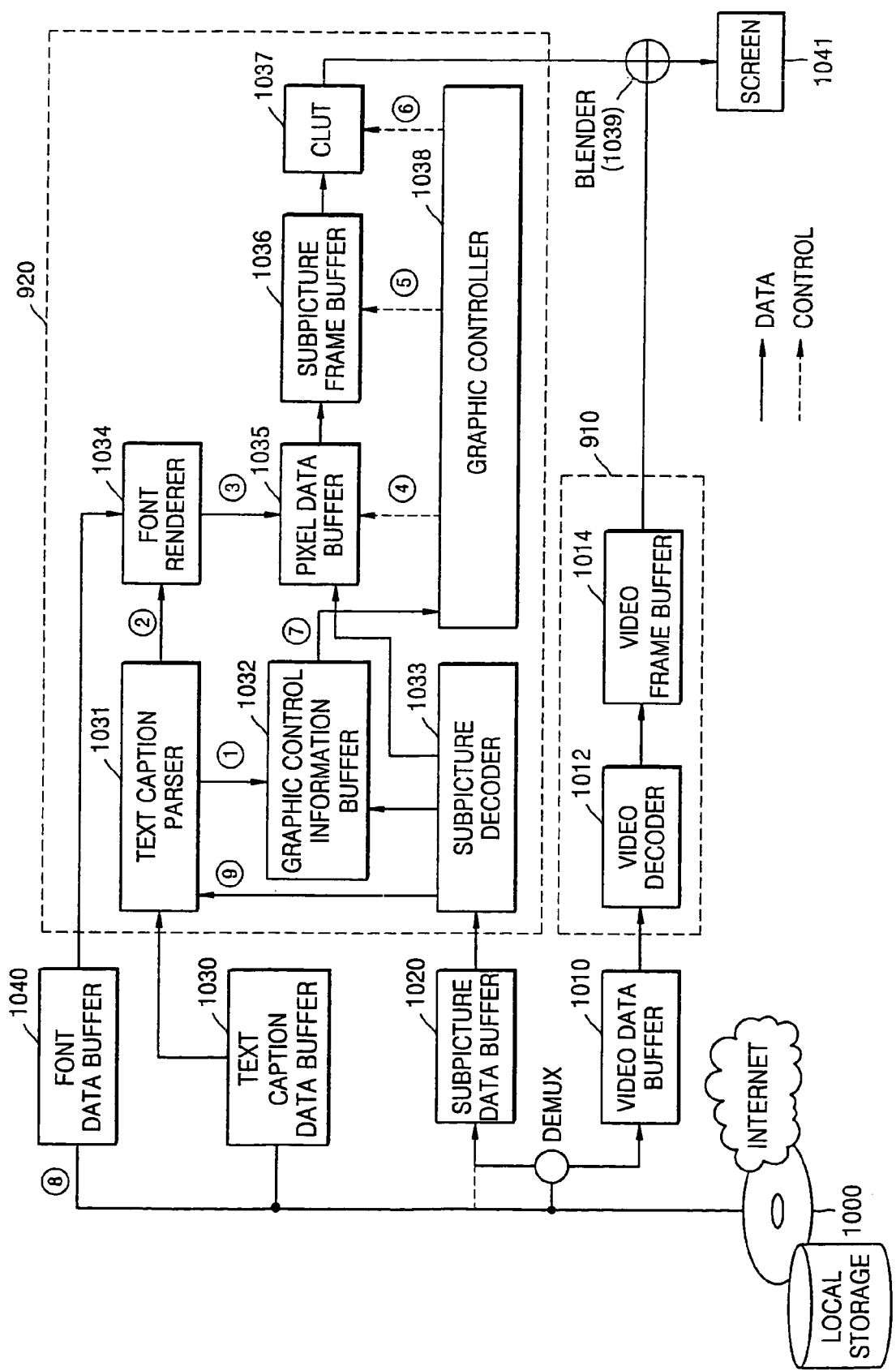
FIG. 10 is a detailed block diagram of the reproducing apparatus shown in FIG. 9.

FIG. 10 is a detailed block diagram of the reproducing apparatus to process a text-based caption shown in FIG. 9.

Referring to FIG. 10, the structure of the text caption data processing unit 920 illustrated in FIG. 9 is shown in detail.

The reproducing apparatus according to this embodiment of the present invention includes buffer units 1010, 1020, 1030, and 1040, a video data processing unit 910, a text caption data processing unit 920, and a blender 1039. Explanation of the audio processing unit described in FIG. 9 will be omitted.

The buffer units 1010, 1020, 1030, and 1040 include a video data buffer 1010, a subpicture data buffer 1020, a text caption data buffer 1030, and a font data buffer 1040. Moving picture data and subtitle data are read from a variety of storage media 1000, including a removable storage medium such as an optical disc, a local storage, and storages on the Internet, and, according to the type of data, stored in respective buffers temporarily. The moving picture data (AV data) is de-multiplexed and, temporarily, video data is stored in the video data buffer 1010, subpicture data for a subtitle is stored in the subpicture data buffer 1020, and audio data is stored in the audio data buffer (not shown). Meanwhile, text data to generate pixel data and control information to control a caption to be output in real time as subtitle data for a text-based caption are temporarily stored in the text caption data buffer 1030, and font data for a subtitle is temporarily stored in the font data buffer 1040. The video data processing unit 910 includes a video decoder 1012 and a video frame buffer 1014, and is the same as explained with reference to FIG. 9.

The text caption data processing unit 920 includes a text caption parser 1031, a font renderer 1034, a subpicture decoder 1033, a graphic controller 1038, a variety of buffers 1032, 1035, and 1036, and a color lookup table (CLUT) 1037.

The text caption parser 1031 decodes and parses text data and control information included in subtitle data. Also, it decodes and parses style information specifying an output style of a caption further included in text data. The parsed text data is transferred to the font renderer 1034 along path 2.

The font renderer 1034 generates a bitmap image so that the parsed text data can be output as a graphic for overlapping. At this time, by reflecting the parsed style information, a bitmap image is generated and the generated graphic data is temporarily stored in the pixel data buffer 1035 along path 3. The data structure of the text data and style information will be explained later.

The subpicture decoder 1033 decodes subpicture data for a subtitle de-multiplexed from the moving picture data. This is provided for compatibility with caption data of the conventional DVD subpicture method. According to another embodiment of the present invention, when text-based subtitle data according to the present invention is packetized and included in moving picture data, text data and control information are de-multiplexed and transferred to the text caption parser 1031 along path 9.

The graphic controller 1038 controls the caption to be output in real time by using control information. In the case of the conventional text-based caption technology such as SAMI of Microsoft described above, only a time for a caption to be output is specified, and therefore, if the caption is reproduced in a hardware device using a low speed processor, real time reproduction, in which moving picture data and caption data are synchronized and output, may not be guaranteed.

However, in the case of the reproducing apparatus according to the present invention, time information regarding when pixel data, which is converted into a bitmap image in the control information described above, is generated and deleted in the buffer memory, and position information regarding a position from which the pixel data is output, are parsed and the output of the pixel data buffer is controlled. By doing so, moving picture data and captions can be synchronized and reproduced in real time.

The variety of buffers 1032, 1035, and 1036 include a graphic control information buffer 1032, a pixel data buffer 1035, and a subpicture frame buffer 1036.

The graphic control information buffer 1032 temporarily stores control information parsed in the text caption parser 1031, and the pixel data buffer 1035 temporarily stores graphic data converted into a bitmap image.

The subpicture frame buffer 1036 temporarily stores pixel data so that the subpicture for a caption can be output by controlling the output of the pixel data according to the time information that is included in the control information from the graphic controller 1038.

The color lookup table (CLUT) 1037 controls the color of a caption to be output by using palette information included in control information.

The blender 1039 superimposes the graphic image of a caption output from the text caption data processing unit 920 on an image output from the video data processing unit 910, and outputs the overlapping images on a screen 1041.

The operation of each block of the reproducing apparatus according to the embodiment of the present invention illustrated in FIG. 10 and described above can be summarized as follows.

First, moving picture data read from the storage medium 1000 is de-multiplexed, and the video data is decoded by the video decoder 1012 after passing through the video data buffer 1010. After being output through the video frame buffer 1014, the decoded video data is output together with the graphic data of a caption output from the text caption processing unit 920, with the graphic data overlapping the video data. Audio data in the moving picture data is decoded by the audio decoder of the audio data processing unit 930 and output through the speaker 932 as shown in FIG. 9.

Meanwhile, text-based subtitle data according to this embodiment of the present invention which is read from the storage medium 1000 is parsed into text data and control information in the text caption parser 1031 after passing through the text caption data buffer 1030. The parsed text data is transferred to the font renderer 1034 along path 2. Here, the text data is converted into graphic data in which caption contents are formed as a bitmap image, and the graphic data is stored in the pixel data buffer 1035.

Meanwhile, control information, parsed into time information to output a caption in real time and output position information of the caption, is transferred through the graphic control information buffer 1032 along path 1 to the graphic controller 1038 along path 7. The graphic controller 1038 adjusts the output speed of the graphic data stored in the pixel data buffer 1035 by using control information, outputs the graphic data to the subpicture frame buffer 1036, and, by referring to the color lookup table 1037, reflects color. The graphic controller 1038 superimposes the graphic data on the moving picture data through the blender 1039 and outputs the data to the screen.

Meanwhile, as another embodiment of the present invention, when text-based subtitle data is packetized and multiplexed with moving picture data, subtitle data is decoded by the subpicture decoder 1033 and transferred to the text caption parser 1031 along path 9. The processing of the subtitle data thereafter is the same as described above.

As an embodiment of the present invention, when subtitle data includes the text data corresponding to pixel data (PXD) among subpicture information of a DVD formed by a bitmap data reproduction method, and the control information corresponding to display control information (SP_DCSQT), the subtitle data decoded by the subpicture decoder 1033 is transferred to the text caption parser 1031, and here, text data is transferred to the font renderer 1034 and control information is transferred to the graphic controller 1038 such that, by using the control information transferred to the graphic controller 1038, a caption is controlled to be output in real time.

As another embodiment of the present invention, when subtitle data includes the text data corresponding to a presentation composition segment (PCS) among presentation data of a Blu-ray disc formed by a bitmap data reproduction method, and the control information corresponding to an object definition segment (ODS), the subtitle data decoded by the subpicture decoder 1033 is transferred to the graphic controller 1038 such that, by using the control information transferred to the graphic controller 1038, a caption is controlled to be output in real time.

A storage medium on which text-based subtitle data according to an embodiment of the present invention is recorded will now be described.

The storage medium according to this embodiment of the present invention includes moving picture data and subtitle data that is output as a graphic overlapping an image based on the moving picture. The subtitle data includes text data to generate pixel data and control information to control a caption to be output in real time.

Text data is utilized to convert caption contents into a bitmap image to be output as a graphic for overlapping. Text data further includes style information specifying the style of a font. Preferably, though not necessarily, the style information includes at least one of a pixel data area, a background color, the starting point at which the first letter of text begins, line spacing information, an output direction, the type of a font, font color, and a character code.

Meanwhile, the control information includes time information regarding when the pixel data obtained by rendering text data is generated and deleted in the buffer memory, and position information regarding a position at which pixel data is output.

As an embodiment of a storage medium according to the present invention, subtitle data may include text data corresponding to pixel data (PXD) among subpicture information, and control information corresponding to display control information (SP_DCSQT) such that predetermined contents similar to the subpicture information of a DVD formed by a bitmap data reproduction method can be included. Subtitle data may be implemented in a text format or may be implemented as data in the form of packets.

Also, as another embodiment of a storage medium according to the present invention, subtitle data may include text data corresponding to a PCS among presentation data, and control information corresponding to an ODS such that predetermined contents similar to presentation data of a Blu-ray disc formed by a bitmap data reproduction method can be included. Subtitle data may be implemented in a text format or may be implemented as data in the form of packets.

Figure 11A:
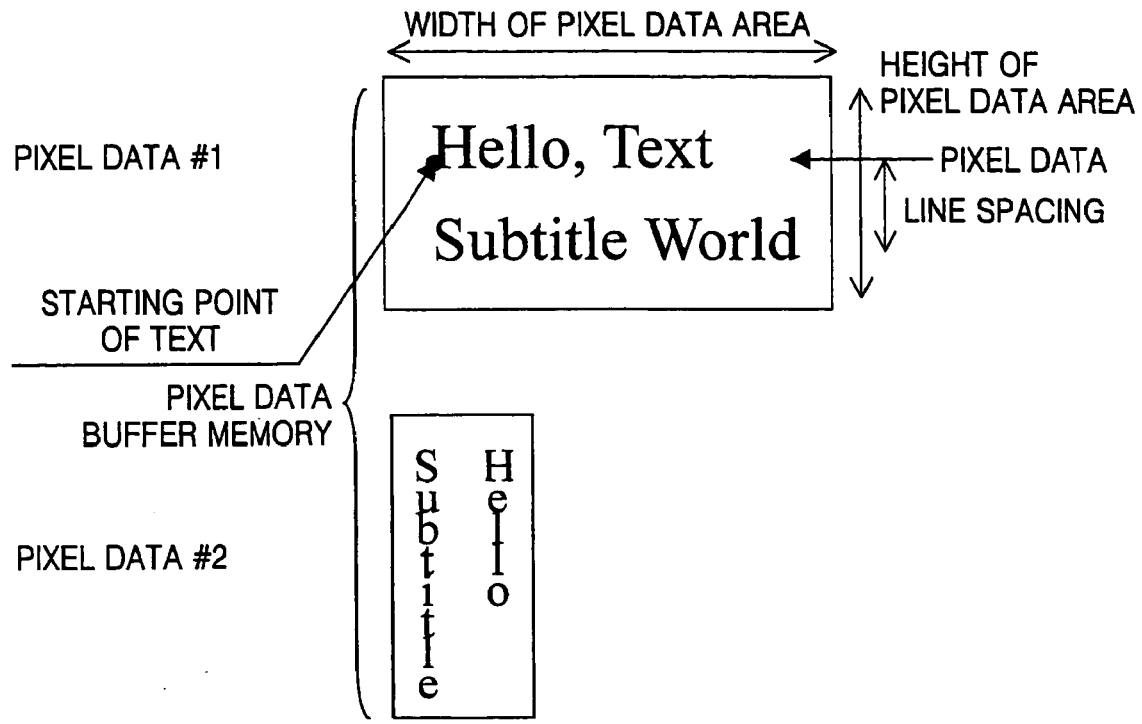
FIG. 11A is an example of text data to generate pixel data according to an embodiment of the present invention.

FIG. 11A is an example of text data to generate pixel data according to an embodiment of the present invention.

Referring to FIG. 11A, in a text data area, text information includes caption contents and style information required to generate a bitmap image of pixel data.

That is, text information includes, for example, the contents of a caption to be output and style information specifying the output style of the caption. As style information, when multiple lines of text are output, information on line spacing is included, and information indicating the output direction of text (left→right, right→left, up→down) can be included. Also, information on a font, such as the size of text, bold, Italic, and underline, is included, and information on line change to render text to begin from the next line, and information on the color of text can be included. In addition, character code information for encoding can be included, for example, information on whether a character code to be used is 8859-1 or UTF-16 can be included.

This text information is an example according to this embodiment of the present invention and can be modified and implemented to fit the characteristic of a medium, such as a DVD and a Blu-ray disc, to which the present invention is applied.

Figure 11B:
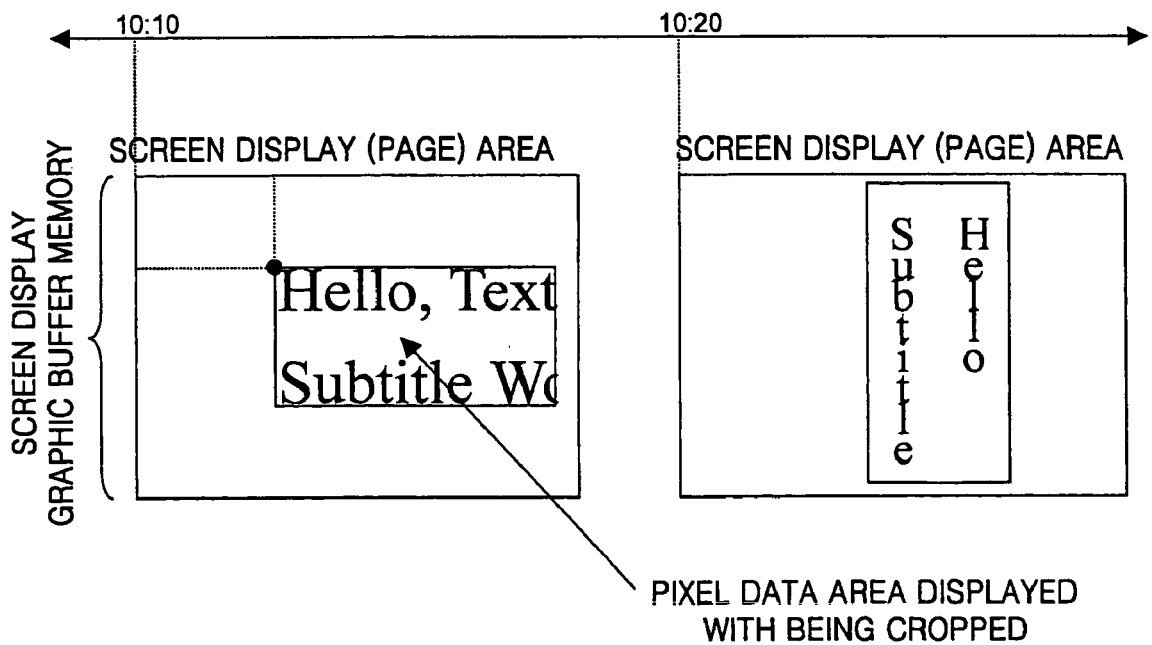
FIG. 11B is an example of graphic control information to control real time display of a caption according to an embodiment of the present invention.

FIG. 11B is an example of graphic control information to control real time display of a caption according to an embodiment of the present invention.

Referring to FIG. 11B, control information to control output of thepixel data converted into a bitmap image is shown.

That is, in order to indicate the size of the pixel data area in which the text data is converted into a bitmap image and rendered, information on the width and height of the pixel data area can be recorded. Also, information on the color of the background of the pixel data, time information regarding when the pixel data is generated and deleted in the pixel data buffer memory, and starting point information indicating a position at which the first line of text characters begin can be recorded. These data items are included in subtitle data as control information, and play the role of controlling a caption to be output in real time.

Figure 8:
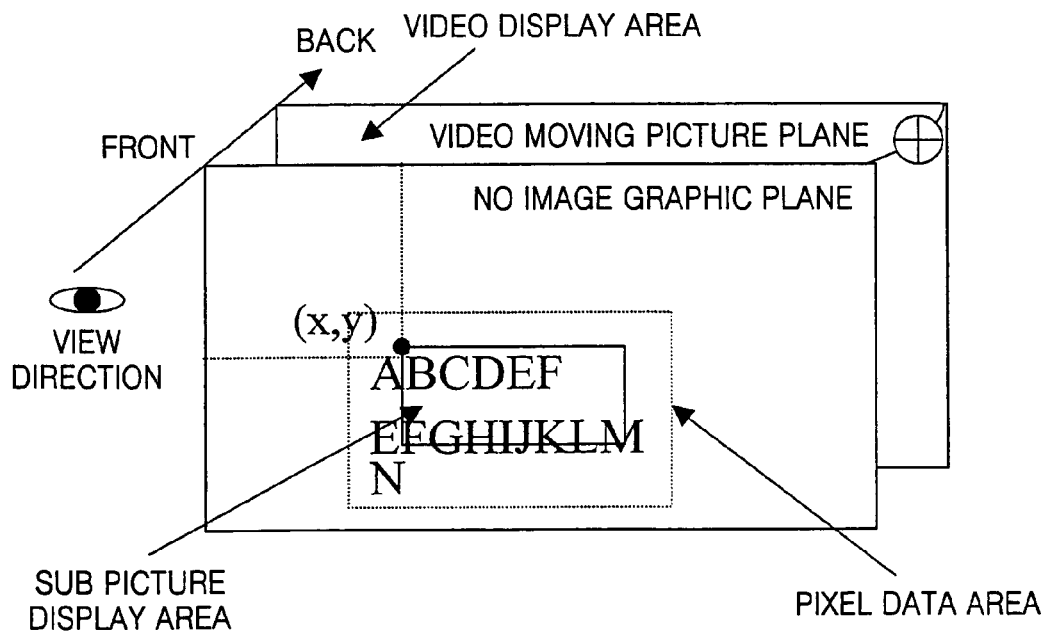
FIG. 8 is a diagram illustrating the output result of a subpicture together with moving picture data according to the data structure described above.

Also, when control data is applied to a Blu-ray disc, in order to collect and output a plurality of pixel data items in one screen, construction information collecting a plurality of data areas into one page can also be included. A color lookup table including information to be used for the background color and foreground color of caption text used in the page can be included. Since a specified area among pixel data information is output on the screen, area specifying information ((Xs, Ys), the width and height information of a pixel data area, or information on starting point (Xs, Ys) and an end point (Xe, Ye), can be included. Also, starting point information in a pixel data area corresponding to the first starting point of a subpicture display area explained with reference to FIG. 8 can also be included. Meanwhile, preferably, though not necessarily, time information is included which indicates a time when pixel data temporarily stored in a buffer is output, and a time when the pixel data is deleted.

This control information is but one example according to an embodiment of the present invention, and can be modified and implemented to fit the characteristic of a medium, such as a DVD and a Blu-ray disc, to which the present invention is applied.

Figure 12:
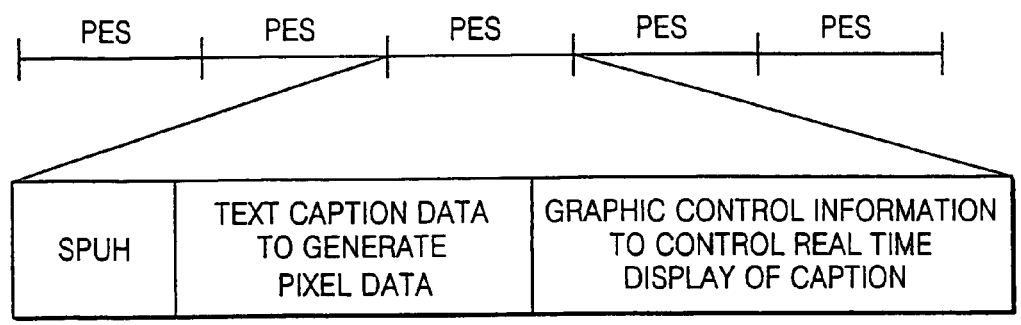
FIG. 12 is a diagram of an embodiment of subtitle data according to the present invention using a subpicture data structure of a DVD.

FIG. 12 is a diagram of an embodiment of subtitle data according to the present invention using a subpicture data structure of a DVD.

Referring to FIG. 12, subtitle data according to this embodiment of the present invention can be implemented in a packet format of the MPEG method that is the construction method of a subpicture data stream of a DVD. That is, in a packetized element stream (PES) structure, in addition to a SPUH having header information, text caption data according to this embodiment of the present invention can be made to be recorded in a PXD area for pixel data, and control information according to this embodiment of the present invention can be made to be recorded in an SP_DCSQT area for output control information. Obviously, subtitle data according to this embodiment of the present invention can be implemented as binary data in the form of a packet, and can also be implemented in a text format including contents similar to the subpicture data stream described above. Any data in a text format or in a binary format can be parsed by the text caption parser 1031 described with reference to FIG. 10. Parsed text data is transferred to the font renderer 1034 along path 2, and control information is transferred to the graphic controller 1038 along path 1 such that based on the control information, a caption converted into a bitmap image can be output in real time.

Figure 13:
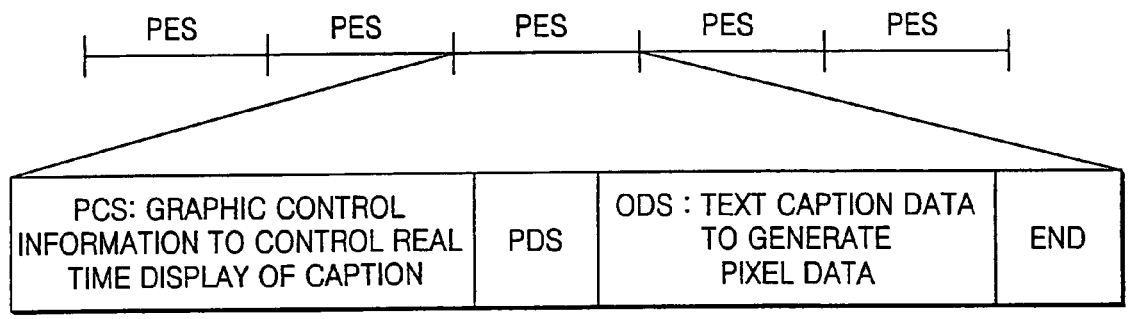
FIG. 13 is a diagram of an embodiment of subtitle data according to the present invention using a presentation data structure of a Blu-ray disc.

FIG. 13 is a diagram of an embodiment of subtitle data according to the present invention using a presentation data structure of a Blu-ray disc.

Referring to FIG. 13, subtitle data according to this embodiment of the present invention can be implemented in a packet format of the MPEG method that is the construction method of a presentation data stream of a Blu-ray disc. That is, in a PES structure, control information can be recorded to correspond to a PCS area and text caption data can be recorded to correspond to an ODS. In addition, a palette definition segment (PDS) and an end segment (END) can be further included. Obviously, subtitle data according to this embodiment of the present invention can be implemented as binary data in the form of a packet, and can also be implemented in a text format including contents similar to the presentation data stream described above.

Any data in a text format or in a binary format can be parsed by the text caption parser 1031 described with reference to FIG. 10. Parsed text data is transferred to the font renderer 1034 along path 2, and control information is transferred to the graphic controller 1038 along path 1 such that based on the control information, a caption converted into a bitmap image can be output in real time.

Figure 15:
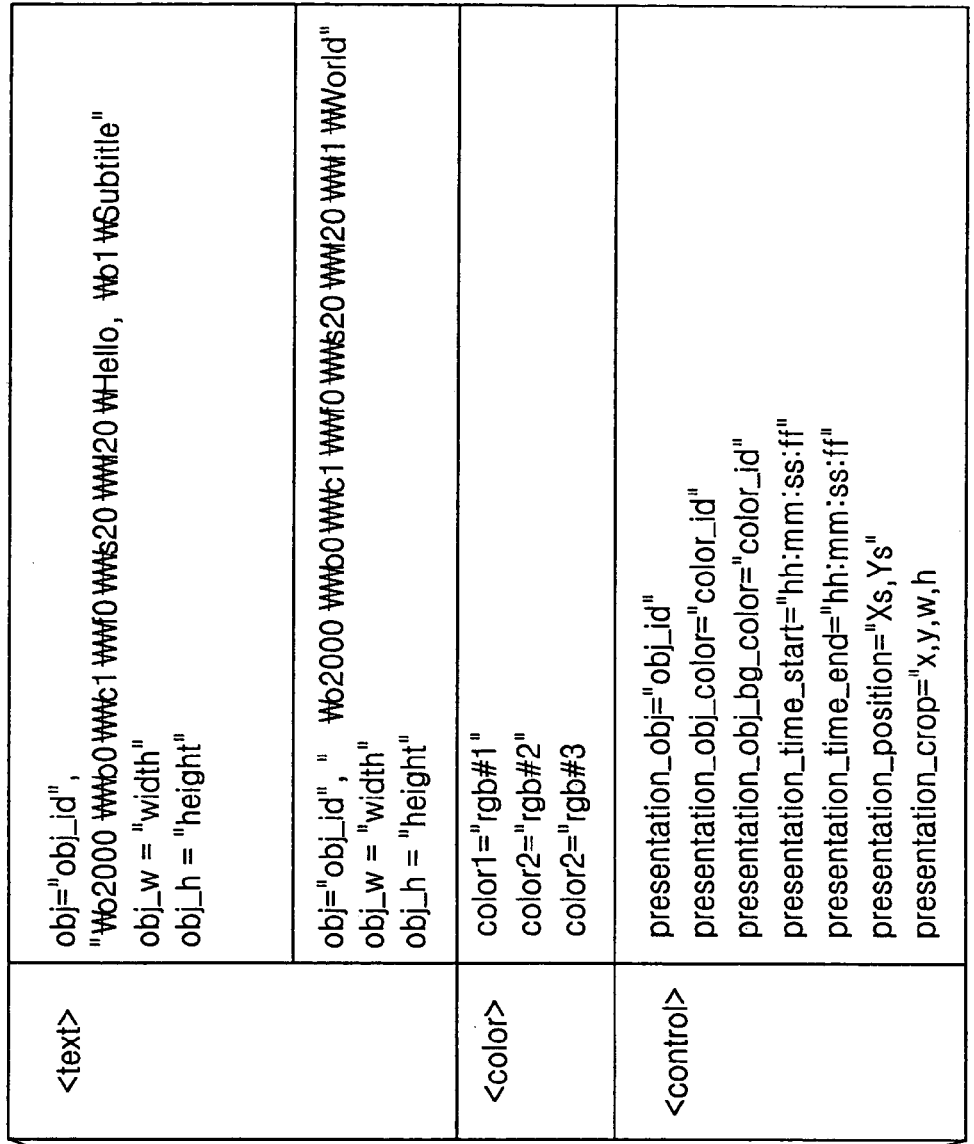
FIG. 15 is a diagram of an embodiment of subtitle data in a text format that can be applied to a Blu-ray disc.

FIGS. 14 and 15 illustrate examples of embodiments of subtitle data implemented in a text format. In particular, FIG. 14 illustrates an example of an embodiment of subtitle data in a text format that can be applied to a DVD, and the subtitle data includes text and control information. Also, FIG. 15 illustrates an example of an embodiment of subtitle data in a text format that can be applied to a Blu-ray disc, and the subtitle data includes text data and control information and can further include color information. FIGS. 14 and 15 are just examples of the data structure of a storage medium according to embodiments of the present invention, and the data structure can be modified and implemented in a variety of ways.

In order to specify the style of subtitle data according to the embodiment of the present invention described above, the following character strings can be used:

\cn]\: specifies a color to be used in text. The basic value is 0.

\bn]\: specifies a background color to be used for the background of text. This should be used at the front of a character string, and the basic value is 0.

\f[n]\: specifies the type of font to be used in text. The basic value is 0.

\s[n]\: specifies the size of font to be used in text. The unit is a pixel and the basic value is 0.

\e[n]\: specifies a character code to be used for encoding text. The encoding method can be changed. If 0, ISO-8859-1 is used, and if 1, UTF-16 is used, and the basic value is 0.

\o[n]\: specifies the position of a starting point from which text is rendered in a pixel data area.

\l[n]\: specifies a line space when a line change for a text character string is performed. The unit for n is a pixel and the basic value is 0.

\d[n]\: specifies the output direction of text. If n is 0, text is output from left to right in the horizontal direction, and if n is 1, text is output from right to left in the horizontal direction. If n is 2, text is output in the vertical direction, and if there is a line change, the line change is performed from right to left. If n is 3, text is output in the vertical direction, and if there is a line change, the line change is performed from left to right. The basic value is 0.

\b[n]\: selects the size of a text character as bold or normal. Bold is 1 and normal is 0, and the basic value is 0.

\i[n]\: selects the shape of a text character as Italic or normal. Italic is 1 and normal is 0, and the basic value is 0.

\u[n]\: specifies whether or not to underline a text character. To underline is 1 and no underline is 0, and the basic value is 0.

\n\: performs line change. The basic value is 0.

\\:\ outputs a character. The basic value is 0.

Figure 16:
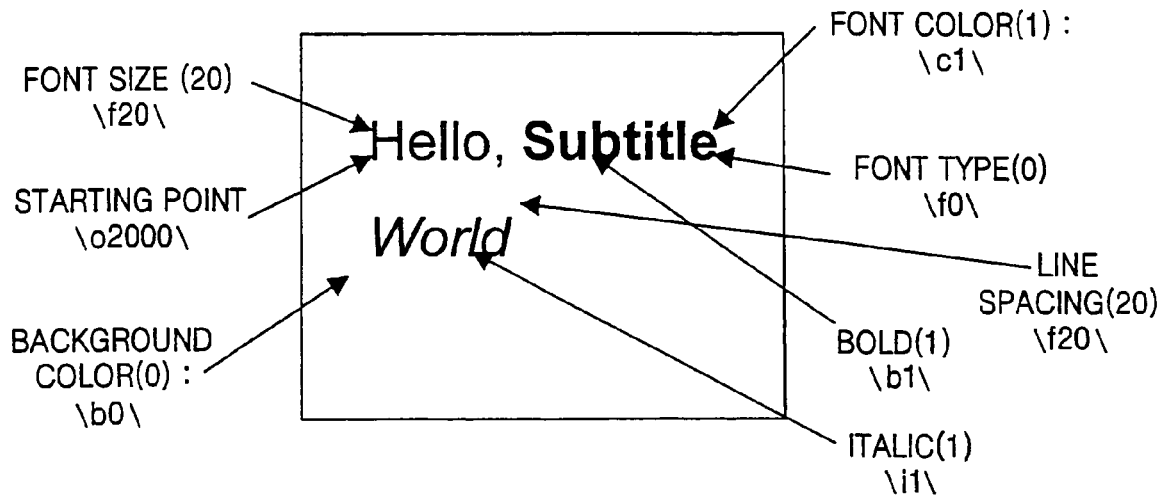
FIG. 16 is a diagram illustrating the output result of caption data according to an embodiment of the present invention.

FIG. 16 is a diagram illustrating the output result of caption data according to an embodiment of the present invention.

Referring to FIG. 16, for example, when the following character string is used as style information, the output result on the screen is shown. That is, when style information, \o2000\ \b0\ \c1\ \f0\ \l20\Hello, \b1\Subtitle\b0\ \i1\ \n\World, is used, the output result of pixel data generated by parsing this information is shown.

For information regarding a font used in text data, font information recorded separately from subtitle data is received from a disc or a network, and related font information is stored in a font buffer memory such that the font information can be used.

A method of processing a text caption based on the structures of the reproducing apparatus and the storage medium described above will now be explained.

Figure 17:
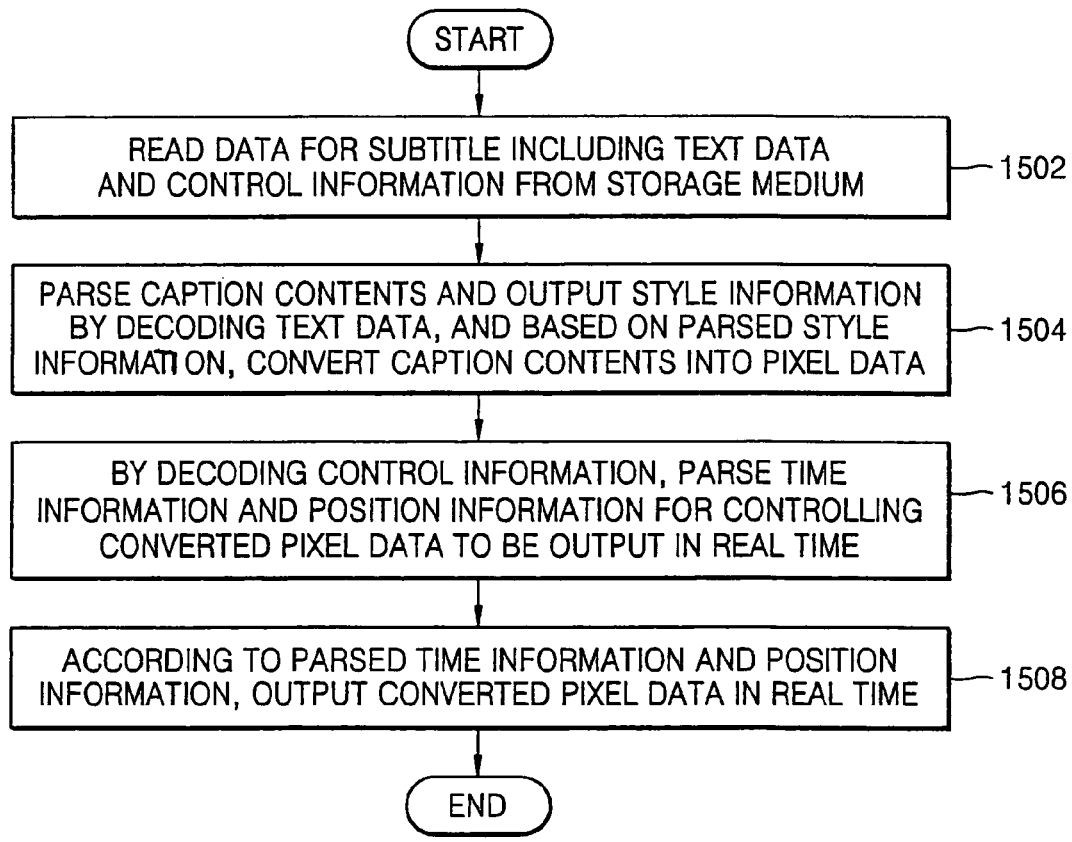
FIG. 17 is a flowchart illustrating operations performed in a method of processing a text caption according to an embodiment of the present invention.

FIG. 17 is a flowchart illustrating operations performed in a method of processing a text caption according to an embodiment of the present invention.

Referring to FIG. 17, in order to reproduce data on a storage medium including moving picture data and subtitle data that is output as a graphic overlapping an image based on the moving picture data, first, subtitle data including text data and control information is read from the storage medium in operation 1502. The read text data is decoded, caption contents and output style information are parsed, and based on the parsed style information, caption contents are converted into pixel data in operation 1504. The read control information is decoded, and time information and position information to control a caption to be output in real time are parsed in operation 1506. According to the parsed time information and position information, the converted pixel data is output in real time in operation 1508.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM). CD-ROMs, magnetic tapes, floppy disks, and optical data storage devices. The computer readable recording medium can also be distributed over network coupled computer systems so that the computer readable code is stored and executed in a distributed fashion.

According to the present invention as described above, an information storage medium including text-based caption information to alleviate the discussed and/or other problems of the text-based caption technology and the subpicture-graphic-based caption technology used in a DVD, and a reproducing apparatus and a reproducing method thereof, are provided.

Accordingly, management of a buffer becomes convenient, and captions in more than two different languages can be output at the same time, or only captions can be output separately without moving picture information. In addition, real time reproduction of captions controlled by hardware can be guaranteed.

Furthermore, since the amount of encoded data of the subtitle data according to the present invention is relatively less than that of the conventional subpicture type caption data based on a bitmap image, address management of a VOBU is easier even when encoding is again performed in order to process multiple languages.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A storage medium readable by a reproducing apparatus, the storage medium comprising:
   moving picture data; and
   subtitle data to be output by the reproducing apparatus as a graphic overlapping an image based on the moving picture data;
   wherein the subtitle data comprises:
      text data enabling the reproducing apparatus to generate pixel data to be converted by the reproducing apparatus into a bitmap image; and control information enabling the reproducing apparatus to control the pixel data to be output in real time;

wherein the text data defines text to be displayed by the reproducing apparatus via the pixel data; and wherein the control information comprises:
time information indicating a time at which the pixel data is to be stored by the reproducing apparatus in a buffer memory of the reproducing apparatus, and a time at which the pixel data is to be deleted by the reproducing apparatus from the buffer memory; and
position information indicating a position at which the pixel data is to be output by the reproducing apparatus.

2. The storage medium of claim 1, wherein the text data enables the reproducing apparatus to generate the pixel data to be converted by the reproducing apparatus into the bitmap image so that caption contents are output by the reproducing apparatus as the graphic overlapping the image.

3. The storage medium of claim 2, wherein the text data comprises style information specifying a style of the caption contents output by the reproducing apparatus as the graphic overlapping the image, the style information comprising a pixel data area, or a background color, or a starting point at which a first letter of text begins, or line spacing information, or an output direction, or a type of a font, or a font color, or a character code, or any combination thereof.

4. The storage medium of claim 1, wherein the text data corresponds to pixel data (PXD) contained in subpicture information; and
the control information corresponds to display control information (SP_DCSQT).

5. The storage medium of claim 4, wherein the subtitle data is in a text format.

6. The storage medium of claim 4, wherein the subtitle data is in a packet format.

7. The storage medium of claim 1, wherein the text data corresponds to a presentation composition segment (PCS) contained in presentation data; and
the control information corresponds to an object definition segment (ODS).

8. The storage medium of claim 7, wherein the subtitle data is in a text format.

9. The storage medium of claim 7, wherein the subtitle data is in a packet format.

10. An apparatus for reproducing information from a storage medium, the storage medium comprising moving picture data and subtitle data to be output as a graphic overlapping an image based on the moving picture data, the apparatus comprising:
a text caption decoder configured to decode text data contained in the subtitle data, generate pixel data converted into a bitmap image based on the decoded text data, and decode and parse control information contained in the subtitle data to control a caption to be output in real time; and
a graphic controller configured to control the pixel data to be output in real time using the control information;
wherein the text data defines the text to be displayed via the pixel data; and
wherein the text caption decoder is configured to parse from the control information:
time information indicating a time at which the pixel data is to be stored in a buffer memory, and a time at which the pixel data is to be deleted from the buffer memory; and
position information indicating a position at which the pixel data is to be output.

11. The apparatus of claim 10, wherein the text caption decoder comprises:
a text caption parser configured to decode and parse the text data and the control information; and
a font renderer configured to convert the parsed text data into a bitmap image so that the parsed text data is output as the graphic overlapping the image.

12. The apparatus of claim 11, wherein the text caption parser is further configured to decode and parse style information from the text data, and specify an output style of the caption; and
the font renderer is further configured to convert the parsed text data into the bitmap image reflecting the parsed style information.

13. The apparatus of claim 11, wherein the text caption parser is further configured to transfer the parsed text data to the font renderer.

14. The apparatus of claim 11, wherein the text caption parser is further configured to transfer the parsed time information and position information to the graphic controller; and
the graphic controller is further configured to control the pixel data to be output in real time by using the parsed time information and position information.

15. The apparatus of claim 10, wherein the text data corresponds to pixel data (PXD) contained in subpicture information of a DVD formed by a bitmap image reproducing method; and
the control information corresponds to display control information (SP_DCSQT).

16. The apparatus of claim 15, wherein the text caption parser is further configured to transfer the parsed text data to the font renderer, and the parsed control information to the graphic controller; and
the graphic controller is further configured to control the pixel data to be output in real time by using the transferred control information.

17. The apparatus of claim 10, wherein the text data corresponds to a presentation composition segment (PCS) contained in presentation data of a Blu-ray disc formed by a bitmap image reproducing method; and
the control information corresponds to an object definition segment (ODS).

18. The apparatus of claim 17, wherein the text caption parser is further configured to transfer the parsed text data to the font renderer, and the parsed control information to the graphic controller; and
the graphic controller is further configured to control the pixel data to be output in real time by using the transferred control information.

* * * * *